United States Patent [19]

Tsutsui et al.

[11] Patent Number: 4,728,988
[45] Date of Patent: Mar. 1, 1988

[54] DRIVING APPARATUS FOR OPTICAL SYSTEMS OF PHOTOCOPIER

[75] Inventors: Eiji Tsutsui, Amagasaki; Arihiro Tsunoda, Higashiosaka, both of Japan

[73] Assignee: Mita Industrial Co., Ltd., Osaka, Japan

[21] Appl. No.: 923,411

[22] Filed: Oct. 27, 1986

[30] Foreign Application Priority Data

Oct. 28, 1985 [JP] Japan ............................ 60-166102[U]

[51] Int. Cl.⁴ ....................... G03B 27/70; B65H 75/28
[52] U.S. Cl. ..................................... 355/11; 242/125.1
[58] Field of Search ............... 355/8, 11, 67, 70, 60, 355/66; 242/117, 125

[56] References Cited

U.S. PATENT DOCUMENTS 3,884,574  5/1975  Doi et al. ............................. 355/8 X
4,367,945  1/1983  Abe ................................... 355/66 X
4,569,763  2/1986  Arai ............................. 242/125.1 X

FOREIGN PATENT DOCUMENTS 1812225  6/1969  Fed. Rep. of Germany ...... 242/117
704961  3/1954  United Kingdom ............. 242/125.1

Primary Examiner—Donald A. Griffin
Attorney, Agent, or Firm—Stiefel, Gross & Kurland

[57] ABSTRACT

The present invention relates to a driving apparatus for the optical systems of a photocopier comprising 1st and 2nd optical systems, 1st and 2nd wires stretched out facing with each other through the wire-fixed ends of the 1st optical system, moving pulleys of the 2nd optical system, fixed pulleys of both systems and a common wire drum for both wires. The common wire drum has two wire drum bodies with a shallow and smooth dented portion, and a screw for pressing and fixing the approximate center of the wires against the bottom surface and/or side surface of the dented portion.

12 Claims, 10 Drawing Figures

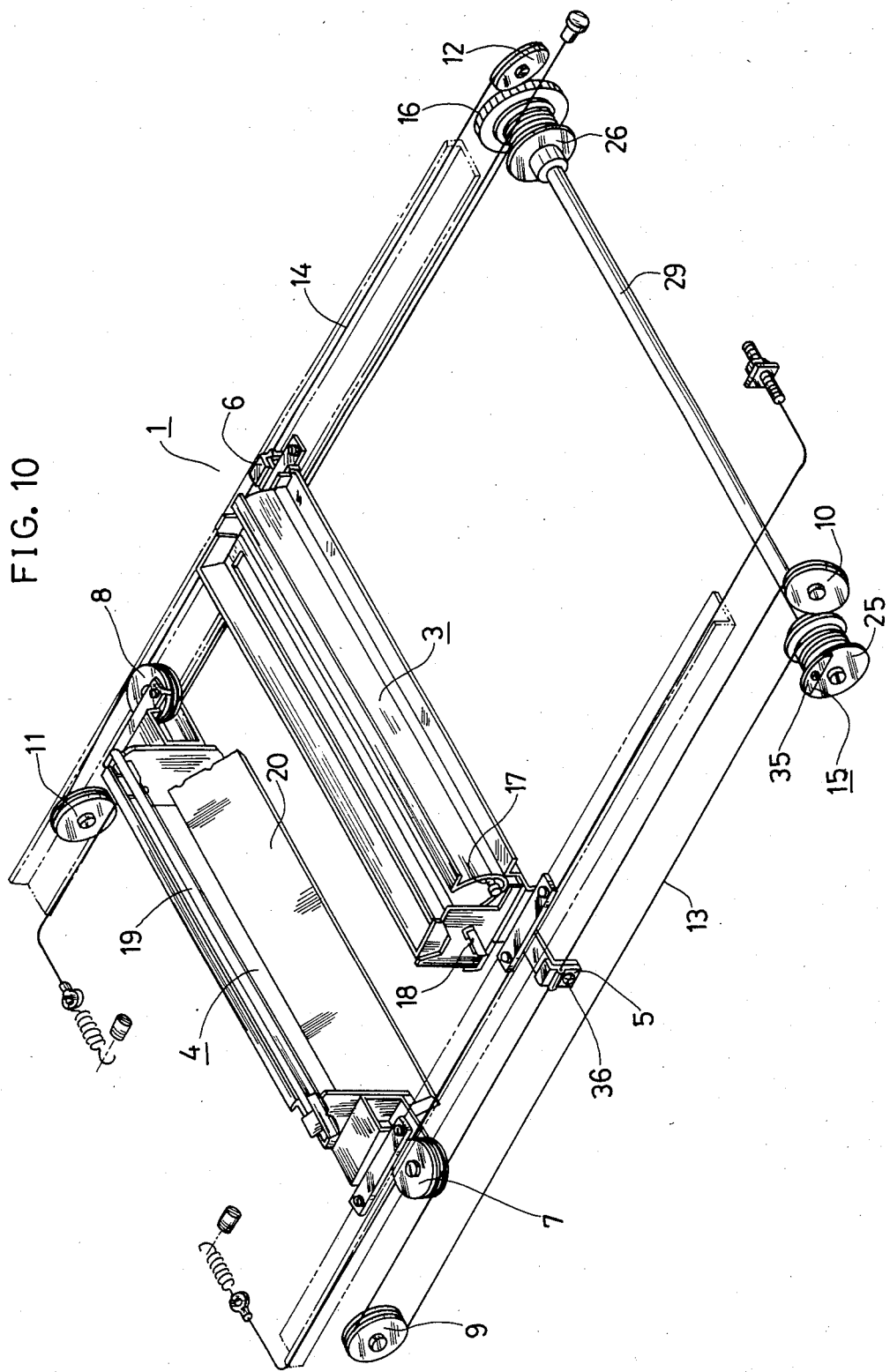

DRIVING APPARATUS FOR OPTICAL SYSTEMS OF PHOTOCOPIER

FIELD OF THE INVENTION

The present invention relates to a driving apparatus for optical systems of a photocopier and more particularly to an improvement of the wire fixing structure to the wire drum which is used for driving of both 1st and 2nd optical systems.

RELATED ART STATEMENT

As a photocopier, there is a known type where 1st and 2nd optical systems are caused to scan at a speed ratio of 2:1 for exposure of an image on an image receiving body. More particularly, the 1st optical system is equipped with a light source and a mirror and is caused to scan to apply light of the light source to the entire surface of an original. On the other hand, the 2nd optical system has mirrors and is caused to scan in the direction similar to the 1st optical system but at a half of the speed of the 1st optical system. The light so applied and then reflected from the original goes first to the mirror of the 1st optical system, and then is reflected by the mirrors of the 2nd optical system and ultimately condensed on a rotating electrostatic photo-sensitive surface of a drum through lens provided in the photocopier to give an electrostatic latent image. Needless to say, the electrostatic latent image corresponds to an image to be copied to a paper.

Therefore, the driving quality of both the 1st and the 2nd optical systems has a direct effect on the copying performance, which is extremely important in successful copying. As an actual apparatus for driving both of the two optical systems, there is known, for example, one in which 1st and 2nd wires are stretched among an end for fixing the wire set on each of both sides of the 1st optical system, a pair of moving pulleys set on both sides of the 2nd optical system and a plurality of fixed pulleys set on both sides of a scanning plane of both the optical systems and a normal or reverse rotating power is given for both the 1st and 2nd wires by means of a common wire drum thereof (see U.S. Pat. No. 4,355,883).

In the common wire drum, the wire (cable) is at its one point fixed on the wire drum body by means of a suitable clamp, and therefore the point is considered to be not adjustable along the wire, as it is predetermined with regard to its location.

Control of the dimensions relative to the specification and installation of both the wires and the pulleys is said to be very difficult; in practice, use must be inevitably made of the available components mentioned not free from the deviation from their specified dimensions to a certain degree. This means that pre-specification of a point of fixing along the wires relative to the common wire drum as described above may perhaps result in the transversal axis of both optical systems, the 1st and the 2nd, not being parallel to the direction of the original and the electrostatic photo-sensitive surface.

The above description can be summarized in that the deviation of the axis in each of both optical systems gives rise to a distortion of the electrostatic latent image, leading utimately to extreme difficulty in obtaining a quality copy exactly representing the original.

SUMMARY OF THE INVENTION

The present invention provides a driving apparatus for optical systems of a photocopier comprising 1st and 2nd optical systems for exposure of an image to an image receiving body installed in a photocopier housing and moving in a single direction at a speed ratio of 2:1 between both of the 1st and 2nd optical systems for scanning, an end for fixing a wire at each of both sides of the 1st optical system, a pair of moving pulleys mounted on both sides of the 2nd optical system, a plurality of fixed pulleys mounted each on both sides of a scanning plane for both the 1st and 2nd optical systems, a 1st wire and a 2nd wire stretched facing each other through the moving pulleys and fixed pulleys, a common wire drum over which both the 1st wire and the 2nd wire are wound and a driving means for the common wire drum, the common wire drum having two wire drum bodies which are of nearly cylindrical shape and mounted on both sides of a common drum shaft and wind the 1st wire and the 2nd wire thereover, each of the wire drum bodies being provided with a shallow and smooth dented portion, and a means for pressing fixedly each of the wires at an approximate center of the wire against the bottom surface and/or side surface of the dented portion.

In other words, according to the present invention, the wire drum body of the common wire provides a specific dented portion, which is able to fix a center portion of the wire to be wound on the bottom surface and/or side surface of the dented portion by screwing of a specific means for fixing it. When screwed, the wire is possible for the wire to be at a temporary position on the drum body and be adjusted to a right position. Therefore, an exact copying with less distortion is possible by performing a simple procedure for settling a temporary position of a center portion of the wire and adjusting.

According to this invention, on the outer periphery surface of each of the wire drum bodies is formed a shallow and smooth dented portion. Possible examples of the dented portion may be such that, only in the approximate center portion of the surface of the wire drum body the dented portion or cut may be formed, with a smoothly flat surface in parallel to the common drum shaft, or with a smoothly curved bottom surface and a side surface normal to the common drum shaft on both sides of the bottom surface.

In an example, the dented portion is preferably short in the direction of the common drum shaft and as shallow as possible, if there is a space large enough for installation of the screw to fix the wire at an approximate center of the dented portion. More particularly, subject to the sizes of both the screw and the wire, the width of 5.0 to 5.5 mm and max. depth of 0.3 to 0.5 mm are preferable (where the screw of M3 and wire size of 1 mm are applied).

As the means for pressing fixedly each of the wires, a screw (bolt) may be most preferably used, the head of which presses fixedly the wire at an approximate center thereof against the bottom surface of the dented portion.

As one of the other embodiments of the dented portion, there is an example in which it has a smooth and flat surface parallel to the common drum shaft, or smoothly curved bottom surface and the side surface normal to the common drum shaft inside the bottom, and the dented portion extends totally up to the outer side of the drum.

Preferably, the dented portion may be short in total length and as shallow as possible, provided there is a space available for installation of the wire-fixing means described later.

A means, in a preferable embodiment, for wire-fixing to the dented portion described above is such that it can be mounted slidably on the bottom surface of the dented portion and comprises a horizontal portion which can be used as a surface for wire winding in combination with the wire drum body, a hanging down portion integral with the outerside of the horizontal portion and a screw which can press fixedly the wire at the inner end of the dented portion to the inside surface of the dented portion.

As regard the above embodiment, the inner end surface of the horizontal portion may also be normal to the common drum shaft, since it is useful for pressing fixedly the wire against the side end of the dented portion, or non-normal to the common drum shaft, since it is again useful for pressing fixedly the wire against both the side end surface and the bottom surface of the dented portion. This means that, in former case, the wire can be adjusted for its position at a higher degree of freedom than otherwise because a gap between the side end of the dented portion and the inner end surface of the horizontal portion thereof is open normal to the common drum shaft.

BRIEF DESCRIPTION OF THE DRAWINGS

FIG. 10 is a view corresponding to FIG. 4 and showing the second embodiment.

DESCRIPTION OF THE PREFERRED EMBODIMENTS

Figure 4:
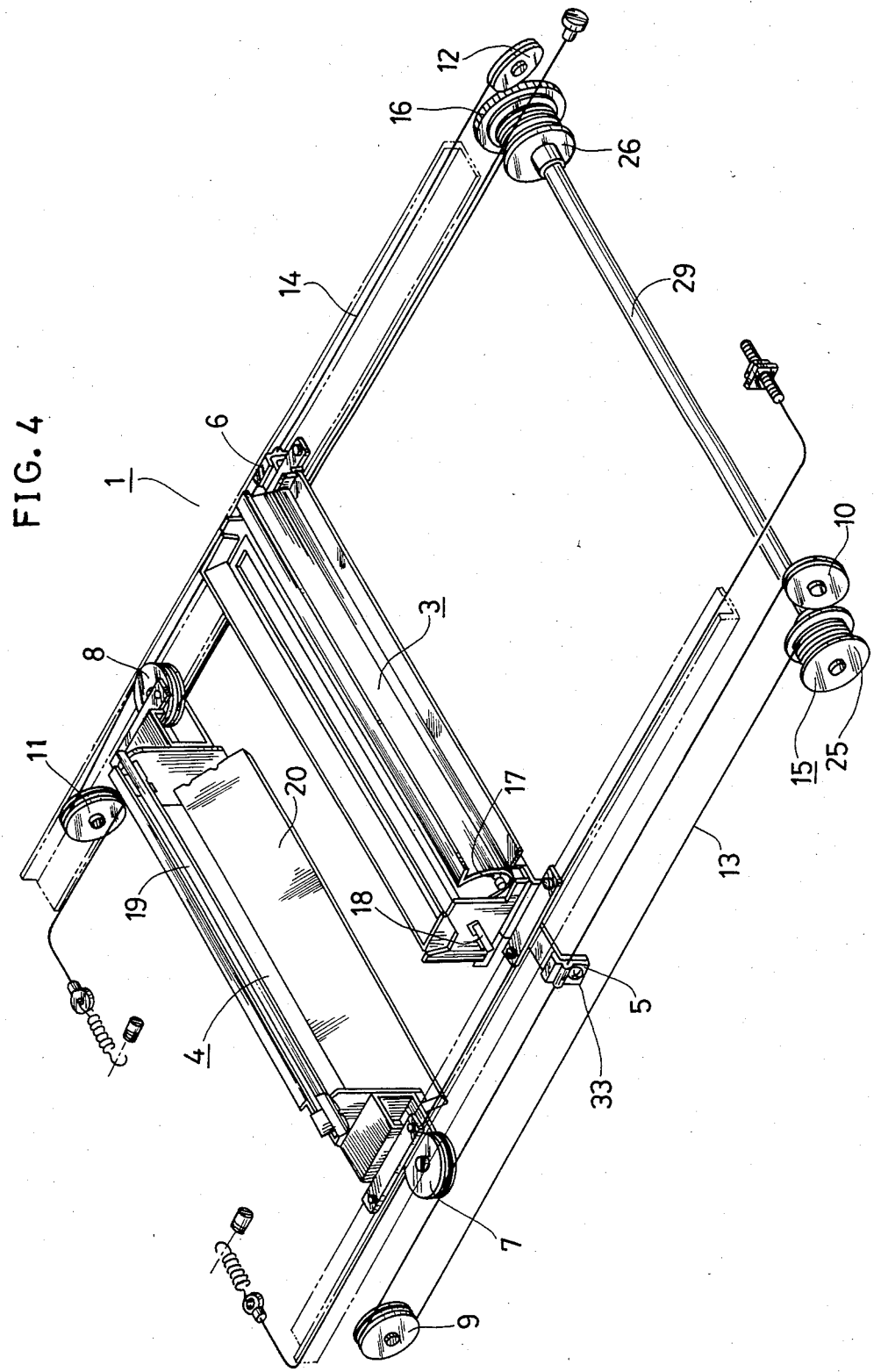
FIG. 4 is an overall approximate perspective view showing the driving apparatus of the optical systems of the embodiment.
Figure 5:
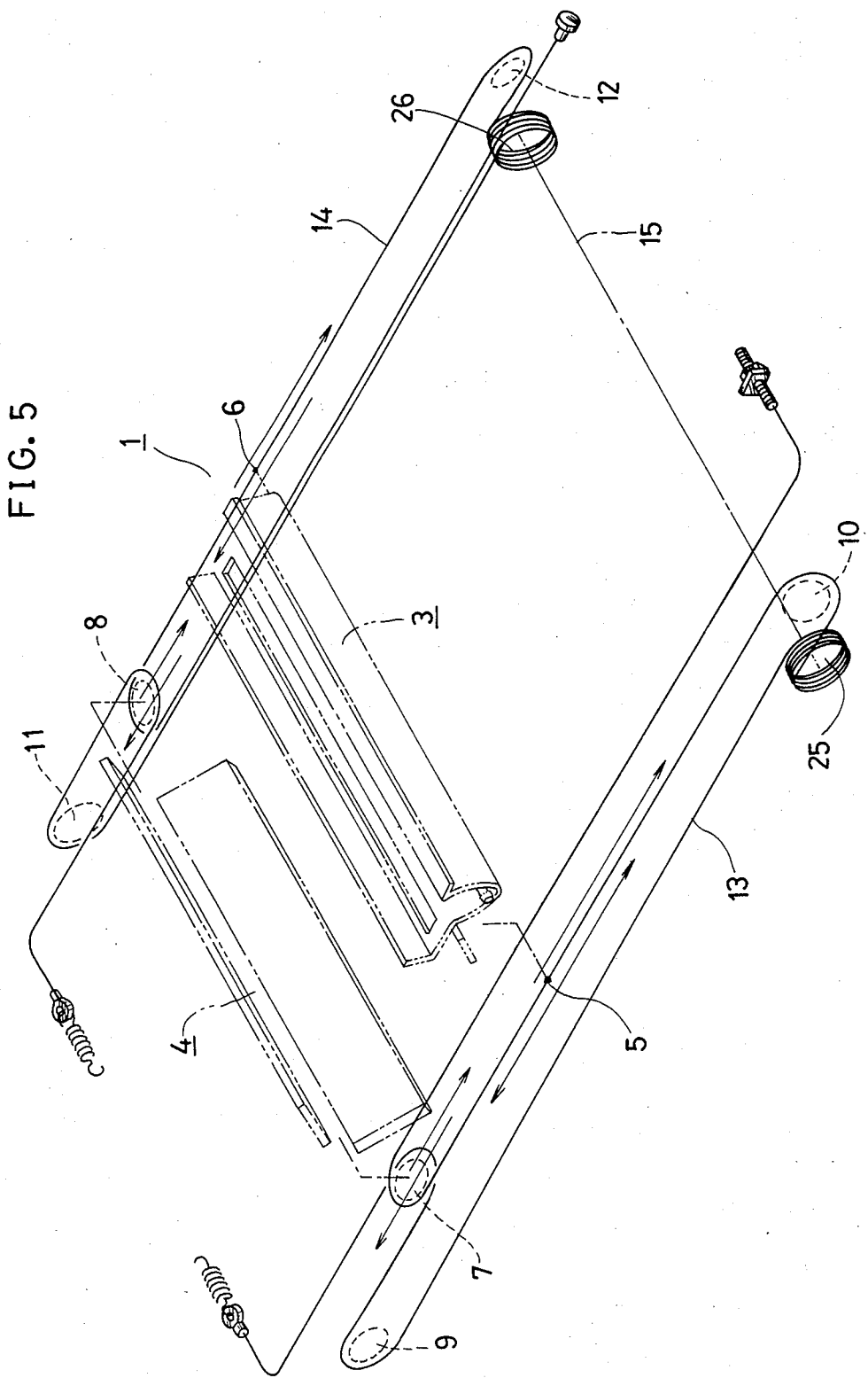
FIG. 5 is a view illustrating the function of the said embodiment.
Figure 6:
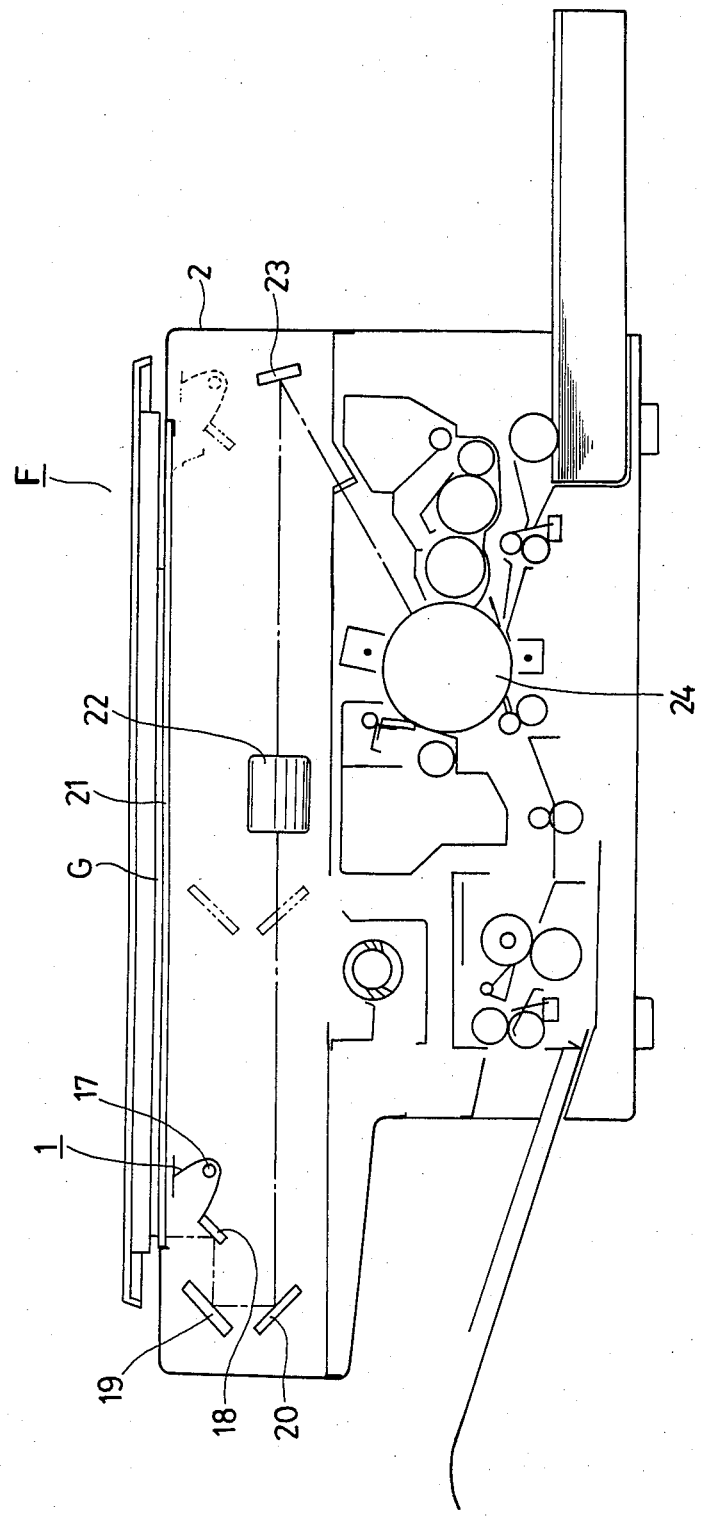
FIG. 6 is a view illustrating the total structure of a copier in corporating the embodiment.
Figure 7:
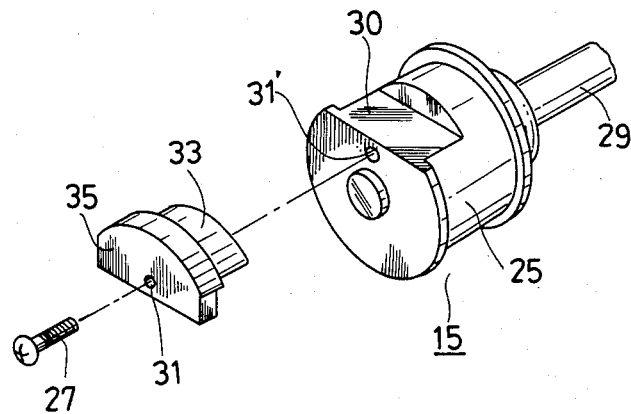
FIG. 7 is an exploded perspective view showing a main portion of another embodiment of the present invention.
Figure 8:
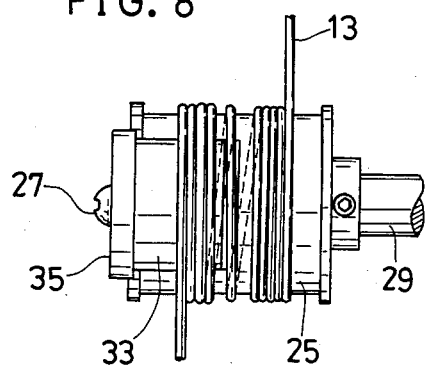
FIG. 8 is a view illustrating the state of the second embodiment ready for working.
Figure 9:
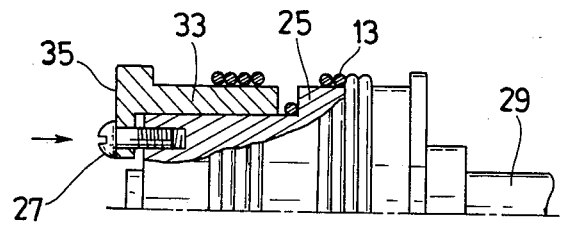
FIG. 9 is a view partly in cross section illustrating a main portion of the second embodiment.

In FIG. 4 to FIG. 6, a driving apparatus, 1 for optical systems of a photocopier F comprises essentially 1st and 2nd optical systems, 3, 4, fixing ends 5, 6 of the 1st optical system for fixing the wires each on both sides of the optical system, moving pulleys 7, 8 mounted each on both sides of the 2nd optical system fixed pulleys 9, 10, 11, 12 arranged each on both sides of the scanning plane of said two optical systems, the 1st wire 13 and the 2nd wire 14 made of 6 or 7 stainless steel strands (elemental wires) stretched out facing each other through the fixed ends 5, 6 fixing the wire, the moving pulleys 7, 8 and the fixed pulleys 9, 10, 11, 12, a common wire drum 15 over which said two wires are wound and a drive gear 16 and a drive moter (not illustrated) as a means of causing normal and reverse rotations of the common wire drum 15.

The 1st optical system 3 is set up by a light source 17 and the a mirror 18, while the 2nd optical system 4 by a 2nd mirror 19 and a 3rd mirror 20. Light emitted from the light source 17 up to an original G placed on a top glass plate 21 is then reflected down to the surface of a photo-sensitive drum 24 through the 1st mirror 18, the 2nd mirror 19, the 3rd mirror 20, a lens 22 and a fixed 4th mirror 23.

Figure 1:
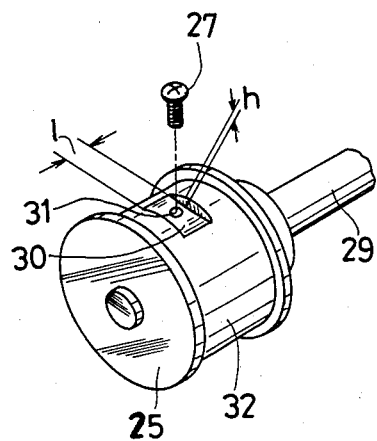
FIG. 1 is a perspective view showing a main portion of an embodiment of the present invention.
Figure 2:
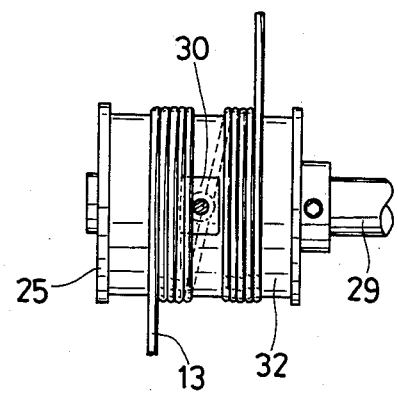
FIG. 2 and FIG. 3 are views illustrating the state of the embodiment ready for working.
Figure 3:
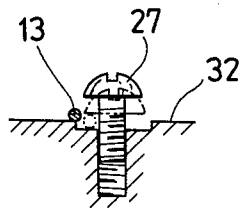

The common wire drum 15 is composed of the wire drum bodies 25, 26 made of aluminum alloy and the screws 27, 28 used for the bodies which are interconnected by means of a common drum shaft (rotating tie rod) 29. The wire drum body 25, particularly as illustrated in FIG. 1 to FIG. 3, has working surface 30 formed by a shallow (small depth h), flat and smooth dented portion of a specified length (1) parallel to the common drum shaft, that is, cut (groove) 30 has a bottom, two sides, and a threaded hole 31 at the center. For another wire drum body 26, which has the similar shape to the said drum body 25, the description is omitted.

Then, the wire 13 is wound over the wire drum body 25 of the common wire drum 15 first four turns (three turns to meet the minimum requirement for movement of component related plus one turn as a reserve) and then an additional four turns, being (arrested by the screw head) over the temporary arresting screw 27 followed by being threaded through the pulleys 9, 10, 17 and so forth.

Having then been wound over both wire drum bodies 25, 26 of the common wire drum 15, the wires 13, 14 are moved together so that all the pulleys with the 2nd mirror (frame or carriage) 4 comes into contact with the edge of the frame (not illustrated), followed by an adjustment of the parallelism of the mirror 4 relative to an axis of the common drum shaft and subsequent tightening of both screws 27, 28, in order to press the wires 13, 14 against the bottom of the dented portion on the surface of the wire drum bodies 25, 26. It is noted that the 1st mirror 3 has now come into contact with the 2nd mirror 4 having been adjusted to right parallelism with the result that the screw 33 of the fixed ends 5, 6 (6 is not illustrated) is then tightened to provide the adjustment to the parallelism to a higher level.

According to the process described above, the fixing of the wires to the wire drum bodies 25, 26 is feasible by adjustment, with the screws 27, 28 tightened for temporary arrest. This makes it easy to place both optical systems, at the desired position with a high level of operating efficiency, without the need to use special jigs to account for any variation in the specified dimension data of the wire and the wire drum body thereby preventing distorted and poorly focused copied images.

Formation of the dented portion on the surface of the wire drum wherein the wire is fixed and which is of integral type, can be realized in a very simple manner. As described above, lock of the wires to the wire drum is by means of the screws, and the fixing is accomplished at the smooth and flat bottom of the dented portion. The wire is pressed, by means of the screw heads against the bottom so that the wire is kept pressed against the wire drum body nearly in the area of contact, thus eliminating the possibility of slippage of the wire when the optical systems are being moved for scanning. All these advantages have been confirmed in actual field use.

In FIG. 7 to FIG. 10, which concern an additional embodiment of the present invention, common wire drum 15 is of approximate cylindrical form and is installed on both sides of the copier housing, for each of the 1st and the 2nd wires 13, 14. Wire drum 15 has two wire drum bodies 25, 26 made of aluminum alloys and comprises dented portion 30 (portion 32 of the drum body 26 not illustrated) formed on the drum surface and cut away from the center towards the outer side, a common drum shaft 29 between the two wire drum bodies, a horizontal portion 33 (34 of drum body 26 not illustrated) made of aluminum alloy, which can be movably mounted on the flat surfaces 30, 32 of the wire drum body and formed into the curved surface for winding of the wire when combined with the wire drum bodies 25, 26, a hanging-down portion 35 (36 not illustrated) made of aluminum alloy integral and downwards from the outer side of the horizontal portion, and a screw 27 (28 not illustrated) which is applied in the direction of the common drum shaft to the outside end surface of the wire drum bodies 25, 26 and can fix the wires 13, 14 to the innermost portion (side surface) of the flat surface 30 at the inside end of the horizontal portions 33, 34. Note that 31' is a threaded hole for application of the screw, while 31 is a through-hole for the screw; the screw 27 is fitted into the threaded hole 31' provided in the wire drum body through the through-hole 31 in the hanging down portion for securing portion 33 to body 25.

According to the process mentioned above, the wire 13, (14 not illustrated) is wound four turns, first over the wire drum body 25 of the common wire drum 15 (three turns for movement and one turn for reserve), then moved down to the dented surface 30 and the inner end face of the horizontal portion 33 by means of the screw 27, followed by being wound for another four turns over the curved surface set up by the said horizontal portion 33 and the said wire drum body 25, and then threaded through various pulleys 7, 9, 10 and so forth to be tensioned.

According to the process mentioned above, wires 13, 14 are kept wound over both wire drum bodies 25, 26 of the common wire drum 15, and the 2nd optical system 4 is moved with various pulleys, up to the the edge of the copier housing (not illustrated) for adjustment of the 2nd optical system 4 for parallelism, followed by tightening the screws 27, 28 for pressing the wires 13, 14, at the inner end surface of the horizontal portions 33, 34, against the sides of the dented portion of the wire drum bodies 25, 26 under pressure. The 1st optical system 3 is then caused to come into contact with the 2nd optical system 4, which has been adjusted to parallelism, in order to tighten the screw 36 (37 not illustrated) for resultant adjustment of the 1st optical system to parallelism. In this manner described, the wires 13, 14 can according to this invention be adjusted to their position of fixing without need for use of a special jigs and regardless of the position of the 2nd mirror.

As described above, a driving apparatus of the photocopier illustrated in FIG. 7 to FIG. 10 can offer favorable characteristics nearly equal to those of the similar apparatus shown in FIG. 1 to FIG. 3.

Use use of the driving apparatus of the optical systems can, as has already been described, enable the adjustment of the parallelism between the 1st and the 2nd optical systems (representing an important part of the copier) by virtue of very simple composition, at a high level of operating efficiency, without the need to use special jigs. Furthermore, use of the apparatus according to the present invention also permits production of the photocopier in quantity at a low cost, the means for fixing the wires to the wires drum bodies being of an extremely simple construction.

What is claimed is:

1. A driving apparatus for optical systems of a photocopier comprising 1st and 2nd optical systems for exposure of an image to an image receiving body installed in a photocopier housing and moving in a single direction at a speed ratio of 2:1 between both of the 1st and 2nd optical systems for scanning, an end for fixing a wire at each of both sides of the 1st optical system, a pair of moving pulleys mounted on both sides of the 2nd optical system, a plurality of fixed pulleys mounted each on both sides of a scanning plane for both the 1st and 2nd optical systems, a 1st wire and a 2nd wire stretched facing each other through the moving pulleys and fixed pulleys, a common wire drum over which both the 1st wire and the 2nd wire are wound and a driving means for the common wire drum, wherein
the common wire drum has two wire drum bodies which are of substantially cylindrical shape and are mounted on both sides of a common drum shaft and wind the 1st wire and the 2nd wire thereover, each of the wire drum bodies being provided with a shallow and smooth dented portion, and a means for adjustably pressing fixedly each of the wires at an approximate center of the wire against the bottom surface and/or side surface of the dented portion.

2. A driving apparatus for optical systems as claimed in claim 1 in which the means for pressing fixedly each of the wires comprises a screw for fixing an approximate center of the wire to the bottom surface of the dented portion of the wire drum body.

3. A driving apparatus of optical systems as claimed in claim 2 in which the dented portion is formed only at an approximate center of the surface of each wire drum body.

4. A driving apparatus of optical systems as claimed in claim 2 in which the dented portion has a width of 5.0 to 5.5 mm.

5. A driving apparatus of optical systems as claimed in claim 2 in which the dented portion has the max. depth of 0.3 to 0.5 mm below the outer periphery surface of the wire drum body.

6. A driving apparatus of optical systems as claimed in claim 1 in which the dented portion is provided on the surface of the wire drum body by cut away toward outside thereof, and the means for pressing fixedly each of the wires comprises a horizontal portion which can be slidably carried on the bottom surface of the dented portion of the wire drum body and form a drum surface for winding the wire in combination with the wire drum body, a hanging down portion extending downward integrally with an outside of the horizontal portion, and a screw for securing the hanging down portion to the outside end of the wire drum body, whereby the wire can be tightly fixed with the inner end of the horizontal portion to at least an inside surface of the dented portion.

7. A driving apparatus of optical systems as claimed in claim 3 in which the hanging down portion has an horizontal screw-accepting through-hole, the wire drum body having a threaded hole at the outside end thereof to receive the screw through the through-hole of the hanging down portion.

8. A driving apparatus of optical systems as claimed in claim 1 in which each of the 1st wire and 2nd wire is pressed and fixed at an approximate center portion in the wire drum body and at the bottom surface and/or side surface of the dented portion of the wire drum body and is four turns wound over both sides of the wire drum body.

9. A driving apparatus for the optical system of a photocopier having first and second optical systems for exposure of an image to an image receiving body installed in a photocopier housing and moving in a single direction at a speed ratio of 2:1 between both of the first and second optical systems for scanning, an end for fixing a wire at each of both sides of the first optical system, a pair of moving pulleys mounted on both sides of the second optical system, a plurality of fixed pulleys mounted each on both sides of a scanning plane for both the first and second optical systems, a first wire and a second wire stretched facing each other through the moving pulleys and fixed pulleys, a common wire drum over which both the first wire and the second wire are wound, and a driving means for the common wire drum, wherein the common wire drum comprises two wire drum bodies which are of substantially cylindrical shape and are mounted on both sides of a common drum shaft and wind the first wire and the second wire thereover, each of the wire drum bodies having (a) a shallow and smooth dented portion, the dented portion having bottom and side surfaces, and (b) means for holding a section of the respective wire against the bottom surface and/or side surface of the dented portion, the shallow and smooth dented portion being provided by a cut-away toward the outside of the respective wire drum body and wherein the means for holding each of the wires comprises (i) a horizontal portion which can be slidably carried on the bottom surface of the dented portion of the wire drum body and form a drum surface for winding the respective wire in combination with the wire drum body, (ii) a hanging down portion extending downward which is integral with an outside of the horizontal portion, and (iii) means for securing the hanging down portion to the outside end of the wire drum body, whereby the wire can be adjustably tightly fixed with the inner end of the horizontal portion to at least a side surface of the dented portion.

10. The driving apparatus of claim 9 wherein each wire is held against the bottom surface and/or side surface of the respective dented portion at the approximate center of the wire.

11. The driving apparatus of claim 9 wherein the means for securing the hanging down portion to the outside end of the respective wire drum body is a screw.

12. The driving apparatus of claim 11 in which the hanging down portion of each wire drum body has a horizontal screw-accepting through-hole and each wire drum body has a threaded hole at the outside end thereof to receive the screw through the through-hole of the hanging down portion.

* * * * *